United States Patent [19]

Yang et al.

[11] 4,282,778

[45] Aug. 11, 1981

[54] MULTI-STAGE GENEVA MECHANISM

[75] Inventors: An T. Yang; Lih M. Hsia, both of Davis, Calif.

[73] Assignee: The Regents of the University of California, Davis, Calif.

[21] Appl. No.: 58,085

[22] Filed: Jul. 16, 1979

[51] Int. Cl.³ .................... B23Q 17/00; F16H 27/06
[52] U.S. Cl. ................................. 74/820; 74/84 R
[58] Field of Search ............... 74/820, 827, 436, 84 R

[56] References Cited

U.S. PATENT DOCUMENTS

| | | |
|---|---|---|
| 2,235,047 | 3/1941 | Sloan . |
| 2,605,647 | 8/1952 | Duvoisin . |
| 2,769,379 | 11/1956 | Perry .................................... 74/436 |
| 3,279,281 | 10/1966 | Anderson et al. . |
| 3,448,624 | 6/1969 | Brown . |
| 3,590,660 | 7/1971 | Chaveneaud . |
| 3,750,494 | 8/1973 | Rice . |

OTHER PUBLICATIONS

"Synthesis of Double-Crank (Drag-Link) Driven Mechanisms With Adjustable Motion and Dwell Time Periods", Cemil Bagci, Mechanisms and Machine Theory, 1977, vol. 12, pp. 619–638.
"Angular Relationships of a Geneva Mechanism During Indexing Movement", Sol Dudnick, Machine Design (Updated).
"Geneva Mechanisms Connected in Series", Journal of Engineering For Industry, 5-1975, R. G. Fenton, pp. 603–608.
"Linkage-Geneva Mechanisms: A Design Study in Mechanism Geometry", K. H. Hunt et al., Proc. Inst. Mech. Engrs., Feb. 1960.
"How To Design Geneva Mechanisms", Ray C. Johnson, Machine Design, 1956, pp. 107-111.
"Intermittent Mechanisms", Guy J. Talbourdet, Machine Design, 1950.

Primary Examiner—Kenneth Dorner
Attorney, Agent, or Firm—Phillips, Moore, Weissenberger, Lempio & Majestic

[57] ABSTRACT

A multi-stage Geneva mechanism comprises first and second Geneva mechanisms and a constant speed ratio drive, such as a gear train, interconnected between the Geneva mechanisms. An adjustment mechanism is connected to the gear train to selectively adjust the phase angle between a crank and wheel of the second stage Geneva mechanism, on the output side of the system. Selective change of such phase angle enables the operator to fine-tune the indexing time to accommodate more precisely the requirements of an automated production line.

9 Claims, 14 Drawing Figures

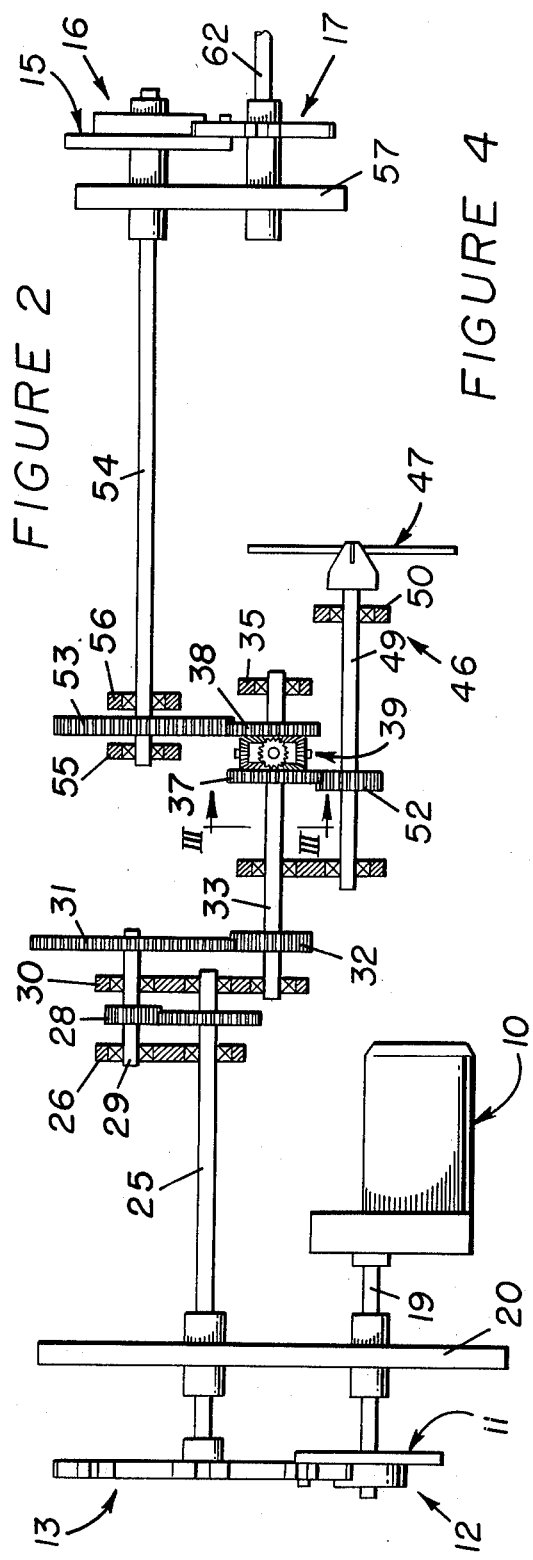
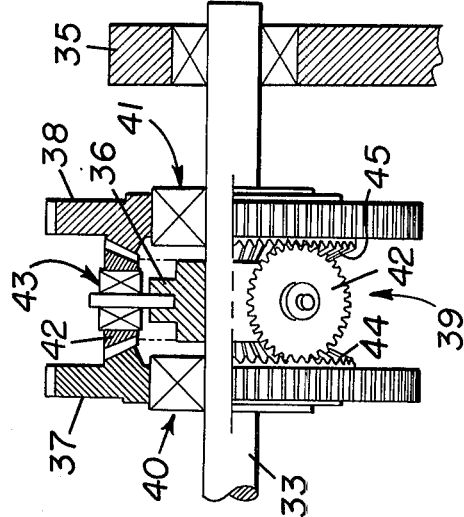
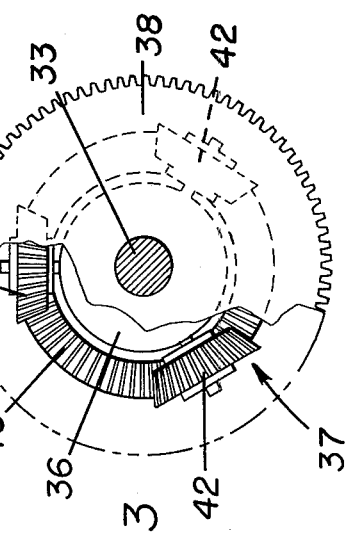

_4,282,778_

MULTI-STAGE GENEVA MECHANISM

DESCRIPTION

Background Art

In general, an automatic mechanical system is an assemblage of a number of synchronized intermittent mechanisms whose basic function is to convert a uniform input rotation into a series of intermittent output motions. The timing of the output motion per cycle must be such that it permits the completion of evey design operation in repetitive, sequential phases. The most crucial task in the design of an intermittent mechanism, therefore, is how to produce the dwell time necessary and sufficient to accommodate the completion of the prescribed series of operations. Intermittent mechanisms of this type are commonly used in many commercial applications, including but not limited to printing, packaging, food processing, mechanized agricultural operations, copying, postal checking processes, and the like.

Where the automatic mechanical system is designed for high speed stop-and-go operation, the intermittent mechanisms in the system must have, in addition to the required dwell time, such favorable kinematic characteristics as a smooth angular acceleration curve and low peak angular acceleration; these characteristics being necessary for the minimization of shock loading and noise during the operation and for the maximization of the useful life of the system.

There are basically two types of intermittent mechanisms that are well known to the design engineer: ratchet gears and Geneva mechanisms. Ratchet gears have found only limited application since their output rotation tends to be unreliable due to the lack of a brake system and their noise levels during operation are quite high. Thus, Geneva mechanisms have found wider commercial applications than ratchet gears for use in intermittent mechanisms. The dwell time produced by a Geneva mechanism is a function of the number of slots on its wheel and the number of pins or drive members on its driving crank. Heretofore, this very limited sphere of design parameters has made it difficult, if not impossible, to adapt the Geneva mechanism to the rigorous demands of a complex automatic mechanical system requiring a lengthy stationary period between sequential phases of operation.

In recent years, R. G. Fenton in his article "Geneva Mechanisms Connected in Series," published in the JOURNAL OF ENGINEERING FOR INDUSTRY (ASME), Volume 97, 1975, pages 603–608, proposed that two suitably matched Geneva mechanisms could be connected in series; the dwell time of such a system would then be a function of the number of slots on the wheels on both mechanisms and the number of pins on both cracks. It also has the added advantage of alleviating shock loading. C. Bagci in his article "Synthesis of Double-Crank Driven Mechanisms with Adjustable Motion and Dwell Time Ratio," published in MECHANISM AND MACHINE THEORY, Volume 12, No. 6, 1977, pages 619–638, presented a scheme in which the driving pin of a Geneva mechanism was rigidly attached to the output link of a double-crank four-bar linkage such that it would provide a relatively long dwell time and variation of the index ratio.

To date, conventional automatic mechanical systems of the stop-and-go type have not provided a short indexing period for long dwell time, as well as providing an adjustable indexing period. The ability to adjust the indexing period of the multi-stage Geneva mechanism of this invention, described more fully hereinafter, enables the design engineer to fulfill the exacting performance requirements of a particular commercial application and, at the same time, offer a comparative cost advantage over non-mechanical devices which are well known to those skilled in the arts relating hereto. Such adjustment also works favorably towards low maintenance costs; minor deviations in indexing cycle from designed norm, which stem from wear and tear after prolonged use, can be corrected on the spot without any lengthy interruption of the assembly line operation involved, for example. In addition, such adjustment offers an economic advantage over conventional systems in that it makes possible changes in the indexing cycle to accommodate the timing requirements of a new production process of procedure in applications wherein the changes from an original design are not extensive. Such flexibility is nowhere found in the prior art.

DISCLOSURE OF INVENTION

An object of this invention is to overcome the above, briefly described problems by providing a multi-stage Geneva mechanism comprising first and second Geneva mechanisms each including a crank having a drive member engageable with a slotted wheel to intermittently drive such wheel. A constant speed ratio drive means is interconnected between the wheel of the first Geneva mechanism and the crank or output of the second Geneva mechanism for rotating such crank one revolution in response to partial revolution of the wheel. Means are provided for selectively adjusting the phase angle between the crank and wheel of the second Geneva mechanism with the phase angle being defined as the included angle between a first line intersecting the centers of rotation of the crank and the wheel and a second line intersecting the center of rotation of the crank and the drive member thereof.

BRIEF DESCRIPTION OF THE DRAWINGS

Other objects and advantages of this invention will become apparent from the following description and accompanying drawings wherein:

FIG. 2 is a top plan view of the multi-stage Geneva mechanism;

FIG. 3 is an enlarged and partially sectioned side elevational view, taken in the direction of arrows III—III in FIG. 2, illustrating a differential mechanism employed in the multi-stage Geneva mechanism;

FIG. 4 is a sectioned, front elevational view of the differential mechanism;

BEST MODE OF CARRYING OUT THE INVENTION

General Description

Figure 1:
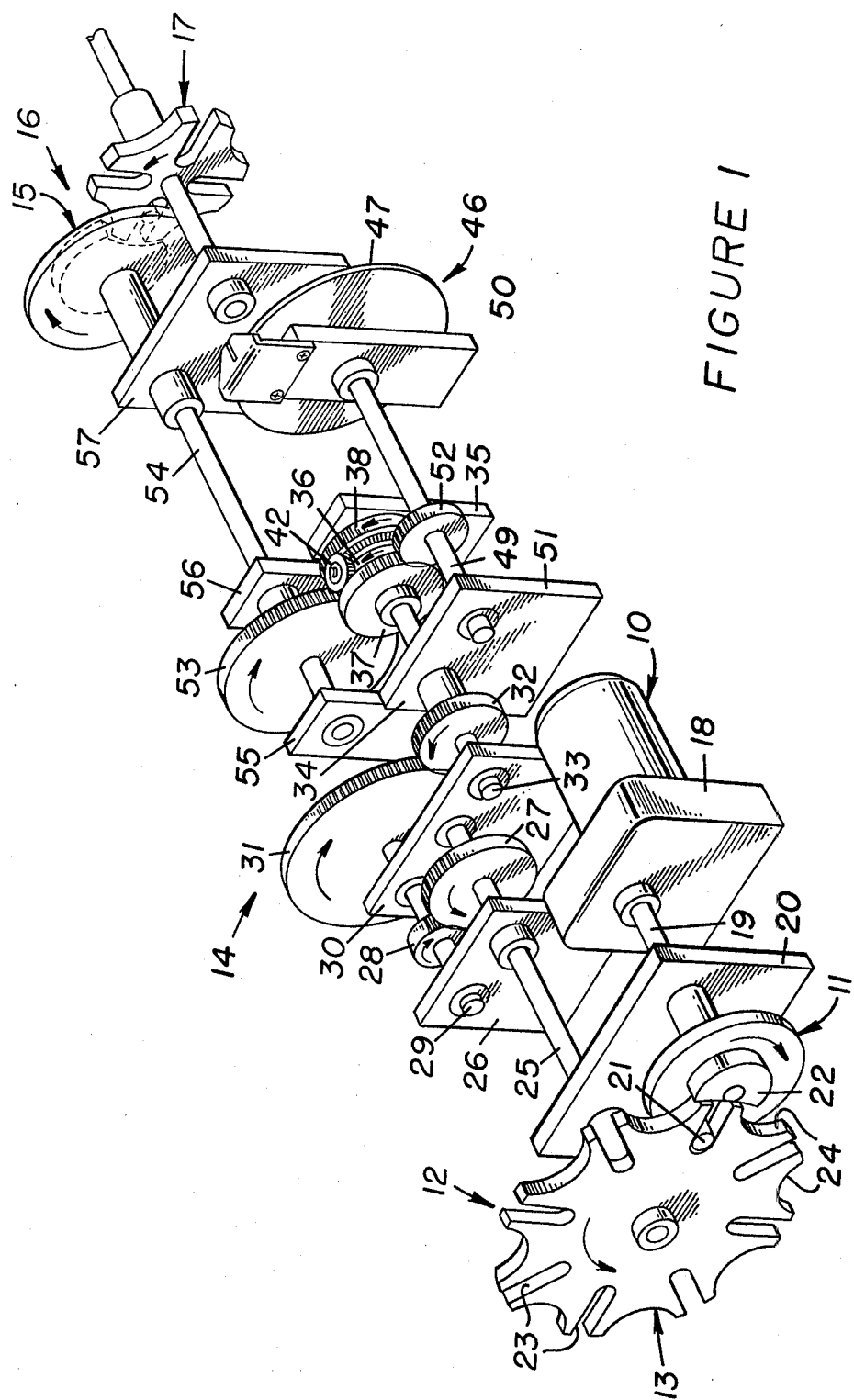
FIG. 1 is an isometric view illustrating a multi-stage Geneva mechanism embodying this invention.

FIGS. 1 and 2 illustrate a multi-stage Geneva mechanism embodying this invention. The mechanism comprises a constant speed electrical drive motor 10 suitably connected to an input member or first crank 11 of a first Geneva mechanism 12. Upon one complete revolution of crank 11, the crank will partially rotate a first wheel 13 of Geneva mechanism 12. Wheel 13 is connected to a gear train 14 which functions as a constant speed ratio drive, as more fully explained hereinafter. In the embodiment illustrated, drive train 14 has an 8:1 gear ratio and wheel 13 has eight slots. Those skilled in the art will appreciate that other types of conventional constant speed ratio drives, such as chains and sprockets or belts and pulleys, could be substituted in lieu of gear train 14.

Drive train 14 is further connected to a second wheel 15 of a second Geneva mechanism 16 to rotate wheel 15 one complete revolution for each partial rotation of wheel 13 of first Geneva mechanism 12. Wheel 15 engages a second crank 17 of second Geneva mechanism 16 to provide an output from the mechanically integrated drive system. As described more fully hereinafter, the multi-stage Geneva mechanism of this invention provides a short indexing period or long dwell time with the short indexing period signifying that less time is needed to move a part from one station to another in an automated production line, thus providing more time to perform a given tast or more tasks at a particular work station.

The indexing period of the mechanism can be adjusted to permit the designer to fine tune the indexing time of the mechanism to accommodate more precisely the needs of the automated production line, including a re-setting of such indexing period to meet the revised requirements of an "on-go" modified operation or those of a modified production line. The mechanism of this invention will find many commercial applications wherein stop-and-go motion is required, such as in apparatus employed for printing, packaging, food processing, mechanized agricultural operations, copying, postal checking processes, and the like.

The multi-stage Geneva mechanism described herein is an n-staged geared Geneva mechanism comprising an assembly of n-Geneva mechanisms 12 and 16 with each mechanism consisting of a driving crank 11 or 15 and a slotted wheel 13 and 17 connected together by (n-1) gear train 14. Crank 11 of first Geneva mechanism 12 constitutes the input member to the system whereas the output member thereof constitutes wheel 17 of second Geneva mechanism 16. Motor 10 provides a continuous and uniform input rotation whereas the output of wheel 17 is an intermittent rotary motion.

Figure 5:
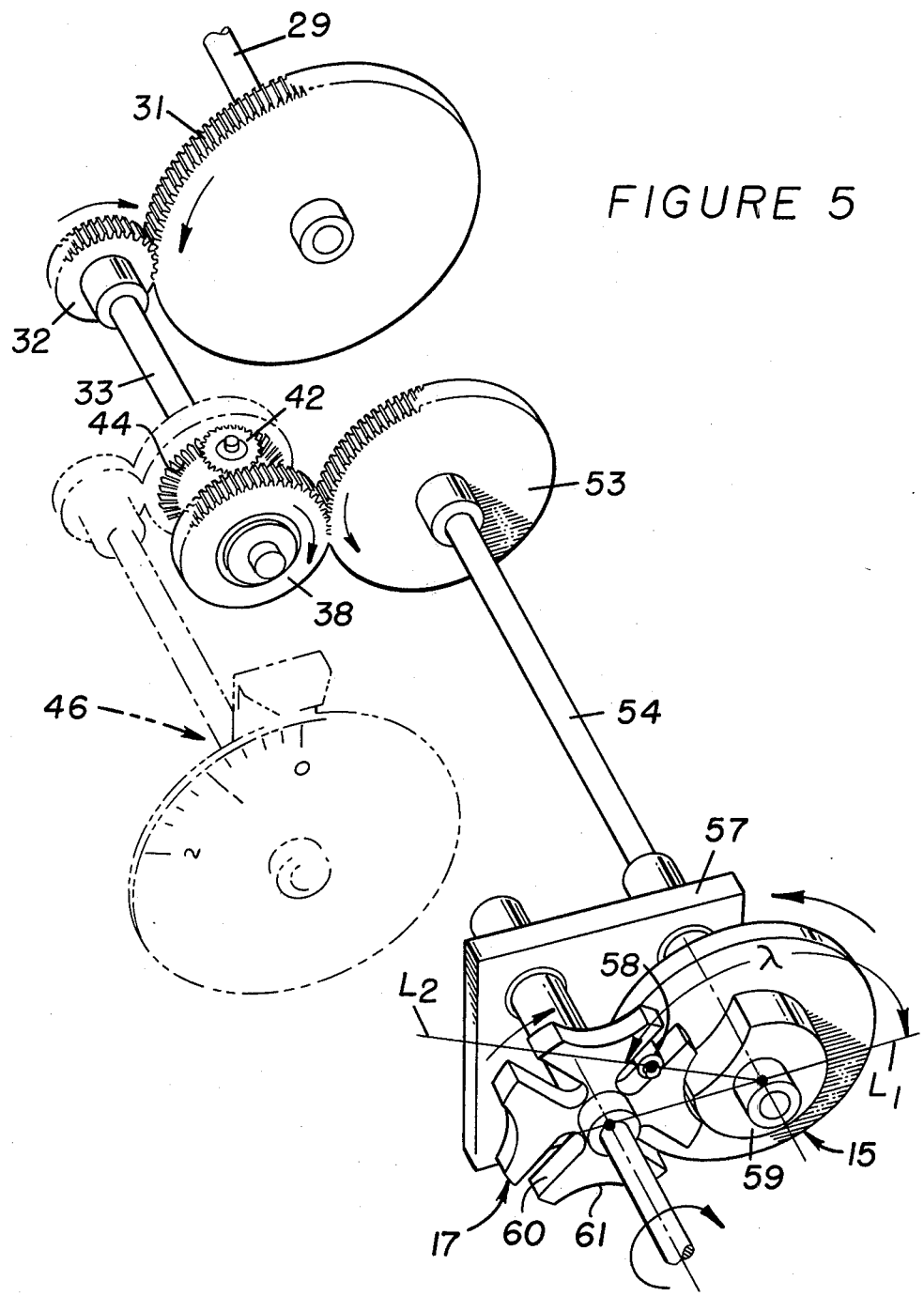
FIGS. 5 and 6 are enlarged isometric views illustrating sequential adjustment of a phase angle employed in the multi-stage Geneva mechanism.

The gear ratio between the wheel of one stage and the crank of its succeeding stage is so chosen that the partial rotation of wheel 13 is converted into a full rotation of crank 15. The multi-stage Geneva mechanism of this invention is so designed that before a pin of crank 11 engages within a slot of wheel 13, the wheel and the entire system is held stationary; each succeeding crank forms an angle with its respective connecting line of centers with such angle being defined as the phase angle ($\lambda$), as shown in FIG. 5. There are (n-1) phase signals in this system. The dwell time produced by an n-stage Geneva mechanism, therefore, is a function of (n-1) phase angles as well as the combined number of slots on all the wheels and the number of pins on all the cranks in the system. Such a system, with a broadened sphere of design parameters, permits the designer to obtain a sufficiently long dwell time to accommodate specified operations and, at the same time, to obtain an output motion with optimal kinematic characteristics.

One may note here that the introduction of phase angles into the family of design parameters is highly significant and meaningful in that it gives the design engineer the much needed flexibility to fine tune the dwell time of the intermittent mechanism already installed so as to accommodate the requirements of a modified operation or those of a modified production line. The derivation for the dwell time in the kinematic analysis of a two-stage Geneva mechanism of this invention will be discussed hereinafter.

DETAILED DESCRIPTION

Referring to FIGS. 1 and 2, the housing of motor 10 may be suitably secured on an upstanding stationary bracket 18. An output shaft 19 of the motor is journalled on bracket 18 and a bracket 20 with the shaft being suitably secured to crank 11 to continuously rotate the same. Crank 11 has a drive member, shown in the form of a pin 21, suitably secured thereon along with a crescent-shaped dwell plate 22. Pin 21 and plate 22 are adapted to alternately engage radial slots 23 and semicircular recesses 24 of wheel 13, respectively, in a conventional manner during operation of Geneva mechaniam 12.

Wheel 13 is secured on a rotary shaft 25 which is journalled for rotation on bracket 20 and another bracket 26. Upon rotation of wheel 13, shaft 25 will rotate an input spur gear 27 of drive train 14 which meshes with a spur gear 28 secured on a shaft 29. Shaft 29 is suitably journalled for rotation on bracket 26 and on a bracket 30.

A spur gear 31 is suitably secured on shaft 29 to rotate in response to rotation of gears 27 and 28. In turn, gear 31 meshes with a spur gear 32, secured on a shaft 33. Shaft 33 is suitably journalled on upstanding brackets 30, 34, and 35 and has a carrier 36 secured thereon, as more clearly shown in FIGS. 3 and 4.

As shown in FIG. 4, a pair of spur gears 37 and 38 are rotatably mounted on shaft 33 by a pair of annular bearing assemblies 40 and 41, respectively. Carrier 36 forms part of a bevel gear differential mechanism 39 which further comprises a plurality of radially disposed bevel gears 42 each rotatably mounted on carrier 36 by a bearing assembly 43. Each bevel gear 42 intermeshes between a pair of bevel or face gears 44 and 45 formed integrally on the inboard sides of gears 37 and 38, respectively.

As described more fully hereinafter, an adjustment means or movable indexing adjuster 46 is connected to gear 37 and differential mechanism 39 to selectively vary the above, briefly described phase angle ($\lambda$) which, in turn, makes possible changes in the indexing cycle to accommodate the timing requirements in a production process. As more clearly shown in FIGS. 1 and 6, indexing means 46 comprises a wheel 47 having indicia 48 suitably imprinted thereon to indicate the degrees of adjustment of the phase angle. Wheel 47 is secured to a shaft 49, suitably journalled for rotation on a pair of brackets 50 and 51, the latter bracket forming part of bracket 34. A spur gear 52 is secured to an end of shaft 49 to mesh with gear 37 whereby the adjustment function may be accomplished, as described more fully hereinafter.

Figure 6:
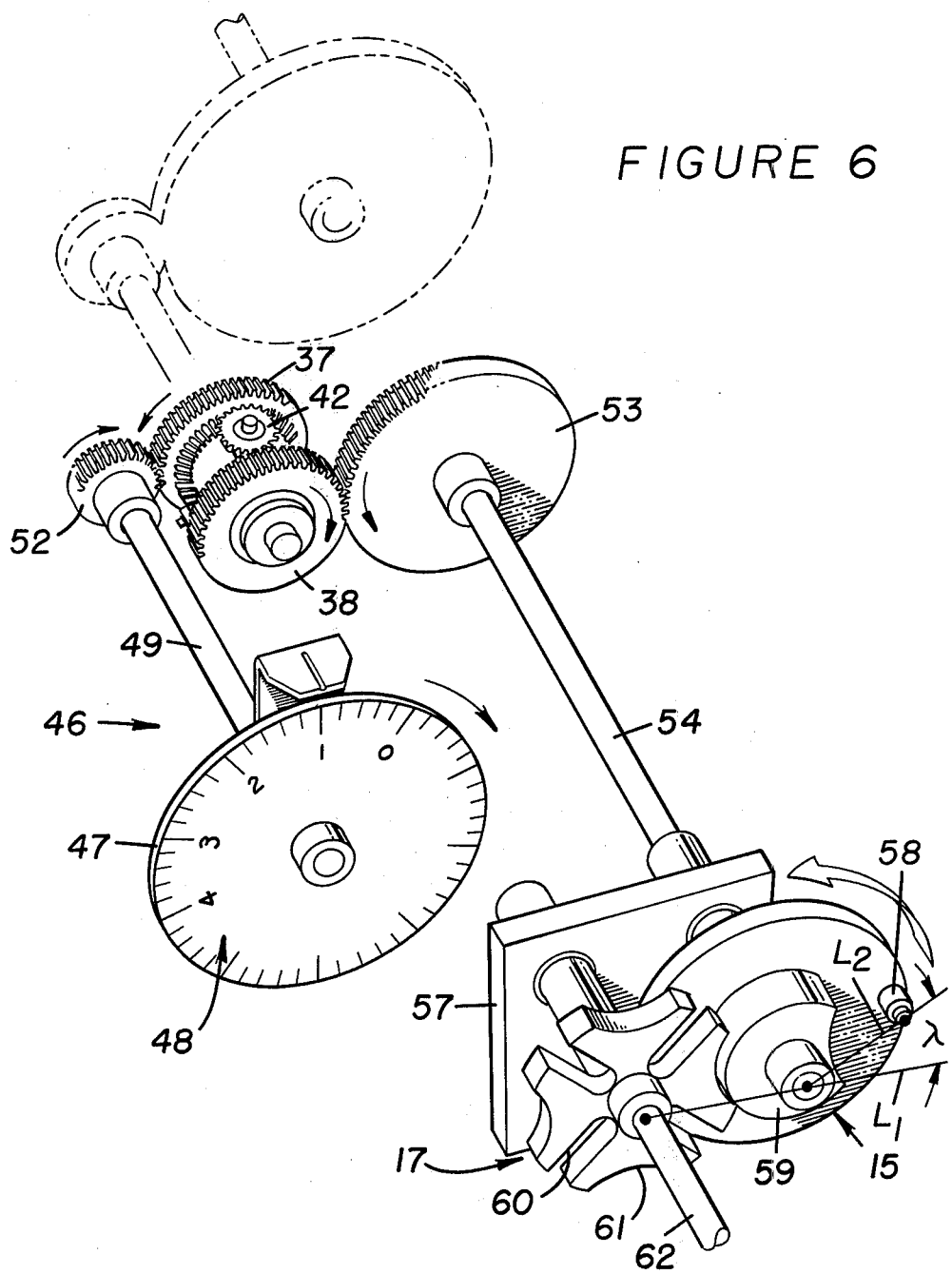

Assuming in FIGS. 1, 2 and 6 that wheel 47 of adjustment means 46 is held stationary during operation of the system to thus prevent rotation of gear 52, gear 37 will not rotate. However, since shaft 33 and carrier 36 are rotating, bevel gears 42 will engage face gear 45 to rotate gear 38. Rotation of gear 38 will, in turn, rotate a spur gear 53 which is secured on a shaft 54, suitably journalled on a pair of brackets 55 and 56. Shaft 54 is further journalled on a bracket 57 and has crank 15 of second Geneva mechanism 16 secured thereon for rotation therewith.

As more clearly shown in FIG. 5, second Geneva mechanism 16 is similar to first Geneva mechanism 12, except for the number of slots formed in wheel 17 thereof. In particular, crank 15 has a drive member or pin 58 secured thereon, along with a crescent-shaped dwell plate 59. Pin 58 and plate 59 are adapted to alternately engage a plurality (four) of radial slots 60 and semi-circular recesses, 61, respectively, formed on wheel 17 of Geneva mechanism 16. Wheel 17 is suitably secured on a shaft 62 which constitutes the drive output of the system and may be suitably connected to a conveyor belt or the like to intermittently drive the same.

Referring to FIG. 6, phase angle λ is defined as the included angle between a first line $L_1$ intersecting axes of rotation of crank 15 and wheel 17 and a second line $L_2$ intersecting the axis of rotation of crank 15 and the center of pin 58. This phase angle may be selectively changed during operation by merely rotating wheel 47, as shown in FIG. 6. In particular, it can be seen that clockwise rotation of wheel 47 in FIG. 6 will, in turn, rotate gear 52 clockwise, gear 37 counterclockwise, gear 38 clockwise (through interconnecting bevel gears 42), gear 53 counterclockwise and crank 15 counterclockwise. Thus, pin 58 and line $L_2$ containing it will change relative to line $L_1$ whereby phase angle λ will be varied a predetermined amount.

DESIGN CONSIDERATIONS

Figure 7:
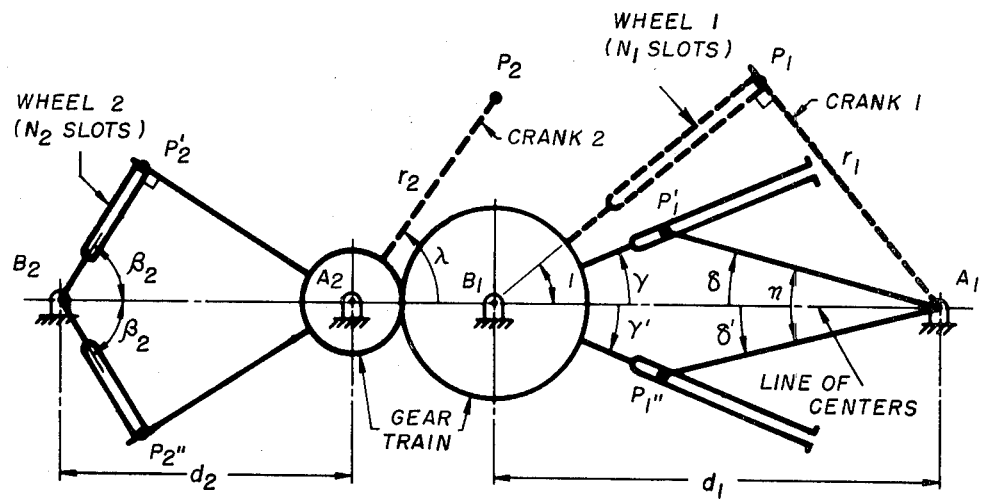
FIG. 7 is a schematic diagram of the multi-stage Geneva mechanism.

The following nomenclature is used hereinafter to define the various design parameters. Referring to FIG. 7, all symbols with subscript $j(j=1,2)$ are associated with the jth stage of the two-stage geared Geneva mechanism. All angles are time invariant and expressed in degrees. For sake of clarity and understanding, first Geneva mechanism 12 will be herein alternatively referred to as the First Stage (1) whereas second Geneva mechanism 16 will be herein alternatively referred to as the Second Stage (2). Thus, wheel 13 (FIG. 1) can be equated to "wheel 1" in FIG. 7, for example.

$A_j$ = the center of rotation of crank j.
$B_j$ = the center of rotation of wheel j.
$P_j$ = driving pin rigidly attached to crank j.
$d_j = A_jB_j$ = distance of centers of jth stage.
$r_j = A_jP_j$ = length of crank j.
$N_j$ = number of equally spaced slots on wheel j.
$\beta_j$ = half-angle between two adjacent slots on wheel j.
$\gamma$ = the position angle of the slot on wheel 1 (measured counterclockwise from line of centers) at the instant when the pin on crank 2 enters the slot on wheel 2.
$\delta$ = the position angle of crank 1 (measured clockwise from line of centers) at the instant when pin on crank 2 enters the slot on wheel 2.
$\gamma'$ = the position angle of slot on wheel 1 (measured clockwise from line of centers) at the instant when pin on crank 2 leaves the slot on wheel 2.
$\delta'$ = the position angle of crank 1 (measured counterclockwise from line of centers) at the instant when pin on crank 2 leaves the slot on wheel 2.
$\lambda$ = phase angle which is the position angle of crank 2 (measured counterclockwise from line of centers $A_2B_2$) before the pin on crank 1 enters the slot on wheel 1.
$\eta = \delta + \delta'$ = index angle.
D = dwell time which is the percentage of the time during which the output member of the mechanism is stationary per cycle of the input member.

Figure 8:
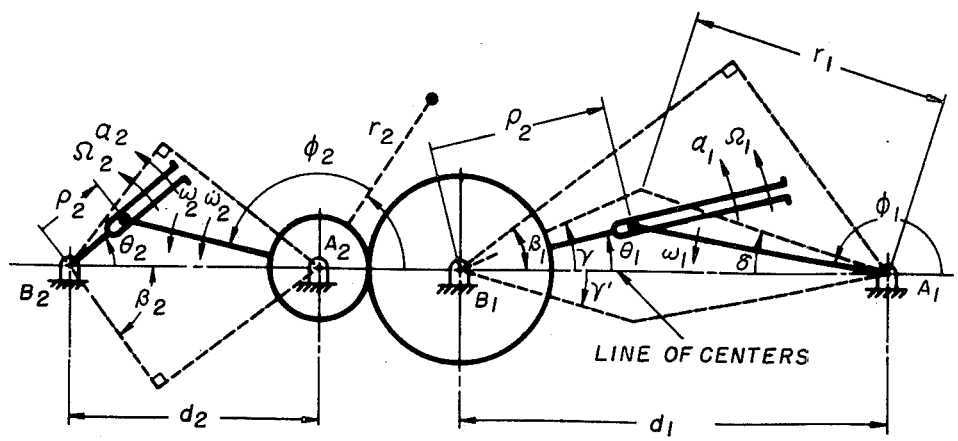
FIG. 8 is a schematic diagram of the multi-stage Geneva mechanism during an indexing period thereof.

Referring to FIG. 8, all angular variables, angular velocities, and angular accelerations are positive in the counterclockwise direction:

$\rho_1$ = the distance from center $B_1$ to the instantaneous position of the pin on crank 1.
$\rho_2$ = the distance from center $B_2$ to the instantaneous position of the pin on crank 2.
$\phi_1$ = angular variable of crank 1 which is referred to as the input angle of the mechanism.
$\phi_2$ = angular variable of crank 2, measured from $A_2P_2$ (the initial position of crank 2).
$\theta_1$ = angular variable of wheel 1.
$\theta_2$ = angular variable of wheel 2 which is referred to as the output angle of the mechanism.
$\Psi$ = modified input variable as defined in equation (28).
$\omega_1$ = constant input angular velocity of the mechanism (rad/s).
$\Omega_1$ = angular velocity of wheel 1 (rad/s).
$\omega_2$ = angular velocity of crank 2 (rad/s).
$\Omega_2$ = angular velocity of wheel 2 (rad/s).
$\alpha_1$ = angular acceleration of wheel 1 (rad/s²).
$\alpha_2$ = angular acceleration of wheel 2 (rad/s²).
$(\Omega_2/\omega_1)$ = velocity ratio of the mechanism.
$(\alpha_2/\omega_1^2)$ = output acceleration of the mechanism.

A schematic diagram of a two-stage geared Geneva mechanism is illustrated in FIG. 7. The input member of the system is crank 1 ($A_1P_1$), the crank of the First Stage; output member of the system is wheel 2, the wheel of the Second Stage. The two stages are connected by a gear train (14 in FIG. 1) with the gear ratio so chosen that upon partial rotation of wheel 1, the wheel of the First Stage, is converted to a full rotation of crank 2, the crank of the Second Stage. The angle between two consecutive slots on wheel 2 is $2\beta_2$. Thus, we have $$\beta_1 = 180/N_1 \quad (1)$$

$$\beta_2 = 180/N_2 \quad (2)$$

where $N_1$ and $N_2$ are the number of slots on wheel 1 and on wheel 2, respectively.

Before the driving pin $P_1$ enters a slot on wheel 1, both crank 2, with its position defined by the phase angle λ, and wheel 2 are at rest. After $P_1$ enters the slot on wheel 1, the latter rotates clockwise and, through the gear train, crank 2 rotates counterclockwise. But wheel 2 remains stationary until the slot of wheel 1 passes the position specified by angle $\gamma$ with the line of centers; at that instant, $P_1$ moves past $P_1'$, $P_2$ moves past $P_2'$ to engage the slot on wheel 2. Thus begins the output motion of the two-stage geared Geneva mechanism. As wheel 2 rotates past an angle $2\beta_2$, $P_2'$ moves past $P_2''$, and crank 2 disengages the slot on wheel 2 (at this instant, the slot on wheel 1 is at the position defined by the angle $\gamma'$ with the line of centers). Wheel 2 stops and once again remains stationary. This completes the output motion of the two-stage geared Geneva mechanism per cycle of its input member. Corresponding to the indexing period during which wheel 2 is in motion, the angle rotated by crank 1, $\eta = \delta + \delta'$, is called the index angle of the mechanism.

DWELL TIME

The angle of rotation of crank 2 from its initial position $A_2P_2$ to the position $A_2P_2'$ where its pin just enters the slot of wheel 2 is $(90 + \beta_2 - \lambda)$. The value of the gear ratio of gear train is $N_1$. Thus, we may write:

$$90 + \beta_2 - \lambda = N_1(\beta_1 - \gamma) \qquad (1)$$

$$180 - 2\beta_2 = N_1(\gamma + \gamma') \qquad (2)$$

from which we obtain, with the aid of equations (1) and (2):

$$\gamma = (90/N_1N_2)(N_2 - 2) + (\gamma/N_1) \qquad (3)$$

$$\gamma' = (90/N_1N_2)(N_2 - 2) - (\gamma/N_1) \qquad (4)$$

Using sine laws, we have:

$$\frac{\sin(\delta + \gamma)}{\sin \gamma} = \frac{\sin(\delta' + \gamma')}{\sin \gamma'} = \frac{d_1}{r_1} = \frac{1}{\sin \beta_1}$$

from which we may solve for:

$$\delta = -\gamma + \sin^{-1}(\sin \gamma / \sin \beta_1) \qquad (5)$$

$$\delta' = -\gamma' + \sin^{-1}(\sin \gamma' / \sin \beta_1) \qquad (6)$$

Finally, we obtain the dwell time of the two-stage geared Geneva mechanism:

$$D = 1 - (\eta/360) \qquad (7)$$

In view of equations (1)–(6), we may express the index angle:

$$\eta = \sin^{-1}\left[\frac{\sin(K + \lambda/N_1)}{\sin(180/N_1)}\right] + \sin^{-1}\left[\frac{\sin(K - \lambda/N_1)}{\sin(180/N_1)}\right] - 2K \qquad (8)$$

with the constant $$K = 90(N_2 - 2)/N_1N_2$$

From equations (7) and (8), we observe that the dwell time $D$ is not just a function of $N_1$ and $N_2$, as expected; the dwell time is also a function of the phase angle $\lambda$. We also observe from the two equations that the dwell time remains the same if we substitute $+\lambda$ by $-\lambda$; this means the phase angle is symmetrical with respect to the line of centers of the Second Stage.

A unique and significant feature of the two-stage geared Geneva mechanism is the introduction of the phase angle $\lambda$ into its universe of design parameters. By manipulating the phase angle by simply adjusting the rotational position of indexing wheel 47 (FIGS. 5 and 6), it becomes possible for the design engineer to "fine tune" the dwell time so as to accommodate more precisely the needs of an automated production line. Moreover, even after installation, the phase angles of such a system can be reset to some extent to meet the requirements of a modified operation or the requirements of a modified production line.

KINEMATIC ANALYSIS

FIG. 8 schematically illustrates the instantaneous position of a two-stage geared Geneva mechanism during an indexing period: $(180 - \delta) \leq \phi_1 \leq (180 + \delta')$. Here, crank 1 rotates with constant angular velocity $\omega_1$ and wheel 2 rotates with angular velocity $\Omega_2$ and angular acceleration $\alpha_2$. Using complex numbers, we may write closure equations of two Geneva mechanisms as $$\rho_1 e^{i\theta_1} = d_1 + r_1 e^{i\phi_1} \qquad (9)$$

$$\rho_2 e^{i\theta_2} = d_2 + r_2 e^{i(\phi_2 + \lambda)} \qquad (10)$$

With coupling gear train 14 whose ratio is $N_1:1$, we have:

$$\phi_2 = N_1(\beta_1 - \theta_1) \qquad (11)$$

From equations (9) and (10), we obtain:

$$\theta_1 = \tan^{-1}\left[\frac{\sin\beta_1 \sin\phi_1}{1 + \sin\beta_1 \cos\phi_1}\right] \qquad (12)$$

$$\theta_2 = \tan^{-1}\left[\frac{\sin\beta_2 \sin(\phi_2 + \lambda)}{1 + \sin\beta_2 \cos(\phi_2 + \lambda)}\right] \qquad (13)$$

$$r_1/\rho_1 = \sin\theta_1/\sin\phi_1 \qquad (14)$$

$$r_2/\rho_2 = \sin\theta_2/\sin(\phi_2 + \lambda) \qquad (15)$$

Differentiating equations (9), (10) and (11) with respect to time, we obtain:

$$(\dot{\rho}_1 + i\rho_1\Omega_1)e^{i\theta_1} = ir_1\omega_1 e^{i\phi_1} \qquad (16)$$

$$(\dot{\rho}_2 + i\rho_2\Omega_2)e^{i\theta_2} = ir_2\omega_2 e^{i(\phi_2 + \lambda)} \qquad (17)$$

$$\omega_2 = -N_1\Omega_1 \qquad (18)$$

With the aid of equations (14) and (15), we obtain from equations (16)–(18):

$$\dot{\rho}_1 = -r_1\omega_1 \sin(\theta_1 - \phi_1) \qquad (19)$$

$$\dot{\rho}_2 = N_1 r_2 \Omega_1 \sin(\theta_2 - \phi_2 + \lambda) \qquad (20)$$

$$\frac{\Omega_1}{\omega_1} = \frac{\sin\theta_1 \cos(\phi_1 - \theta_1)}{\sin\phi_1} \qquad (21)$$

$$\frac{\Omega_2}{\omega_1} = -N_1\left(\frac{\Omega_1}{\omega_1}\right)\left[\frac{\sin\theta_2 \cos(\phi_2 - \theta_2 + \lambda)}{\sin(\phi_2 + \lambda)}\right] \qquad (22)$$

Differentiating equations (16)–(20) with respect to time, we obtain:

$$[(\ddot{\rho}_1 - \rho_1\Omega_1^2) + i(2\dot{\rho}_1\Omega_1 + \rho_1\alpha_1)]e^{i\theta_1} \qquad (23)$$
$$= -r_1\omega_1^2 e^{i\phi_1}$$

$$[(\ddot{\rho}_2 - \rho_2\Omega_2^2) + i(2\dot{\rho}_2\Omega_2 + \rho_2\alpha_2)]e^{i\theta_2} \qquad (24)$$
$$= r_2(-\omega_2^2 + i\dot{\omega}_2)e^{i(\phi_2+\gamma)}$$

$$\dot{\omega}_2 = -N_1\alpha_1 \qquad (25)$$

From equation (23) and with the aid of equations (14) and (19), we may solve for:

$$\frac{\alpha_1}{\omega_1^2} = \left[2\left(\frac{\Omega_1}{\omega_1}\right) - 1\right]\left[\frac{\sin\theta_1 \sin(\theta_1 - \phi_1)}{\sin\phi_1}\right] \qquad (26)$$

From equation (24) and with the aid of equations (15), (20) and (25), we may solve for:

$$\frac{\alpha_2}{\omega_1^2} = -\frac{N_1\sin\theta_2}{\sin(\phi_2+\lambda)}\left\{\left(\frac{\Omega_1}{\omega_1}\right)\left[N_1\left(\frac{\Omega_1}{\omega_1}\right) + 2\left(\frac{\Omega_2}{\omega_1}\right)\sin(\phi_2 - \theta_2 + \lambda)\right] + \left(\frac{\alpha_1}{\omega_1^2}\right)\cos(\phi_2 - \theta_2 + \lambda)\right\} \qquad (27)$$

From equations (22) and (27), we find that the velocity ratio $(\Omega_2/\omega_1)$ and the output acceleration $(\alpha_2/\omega_1^2)$ are functions of $\phi_1$; they are referred to, respectively, as the velocity curve and the acceleration curve of the mechanism. The two curves completely describe the kinematic characteristics of the output of the two-stage geared Geneva mechanism. It is to be noted here that $(\Omega_2/\omega_1)$ and $(\alpha_2/\omega_1^2)$ are also dependent on $N_1$, $N_2$ and $\lambda$. Thus equipped with such a variety of design parameters at his disposal, the design engineer is in a position to select an intermittent mechanism which will produce the dwell time prescribed and, at the same time, has the optimal kinematic characteristics for the given application.

SUMMARY OF RESULTS

We may observe from equations (7), (22) and (27) that dwell time D, velocity ratio $(\Omega_2/\omega_1)$ and output acceleration $(\alpha_2/\omega_1^2)$ are independent of the length parameters $d_1$, $d_2$, $r_1$ and $r_2$; they are, however, dependent on the number of slots on wheel 1 and wheel 2 ($N_1$ and $N_2$) and the phase angle $\lambda$. To illustrate the combined effects of the three design parameters $N_1$, $N_2$, and $\lambda$ on dwell time and the kinematic characteristics of the two-stage geared Geneva mechanism, we summarize the results of the preceding analysis in a series of charts and graphs.

Figure 9:
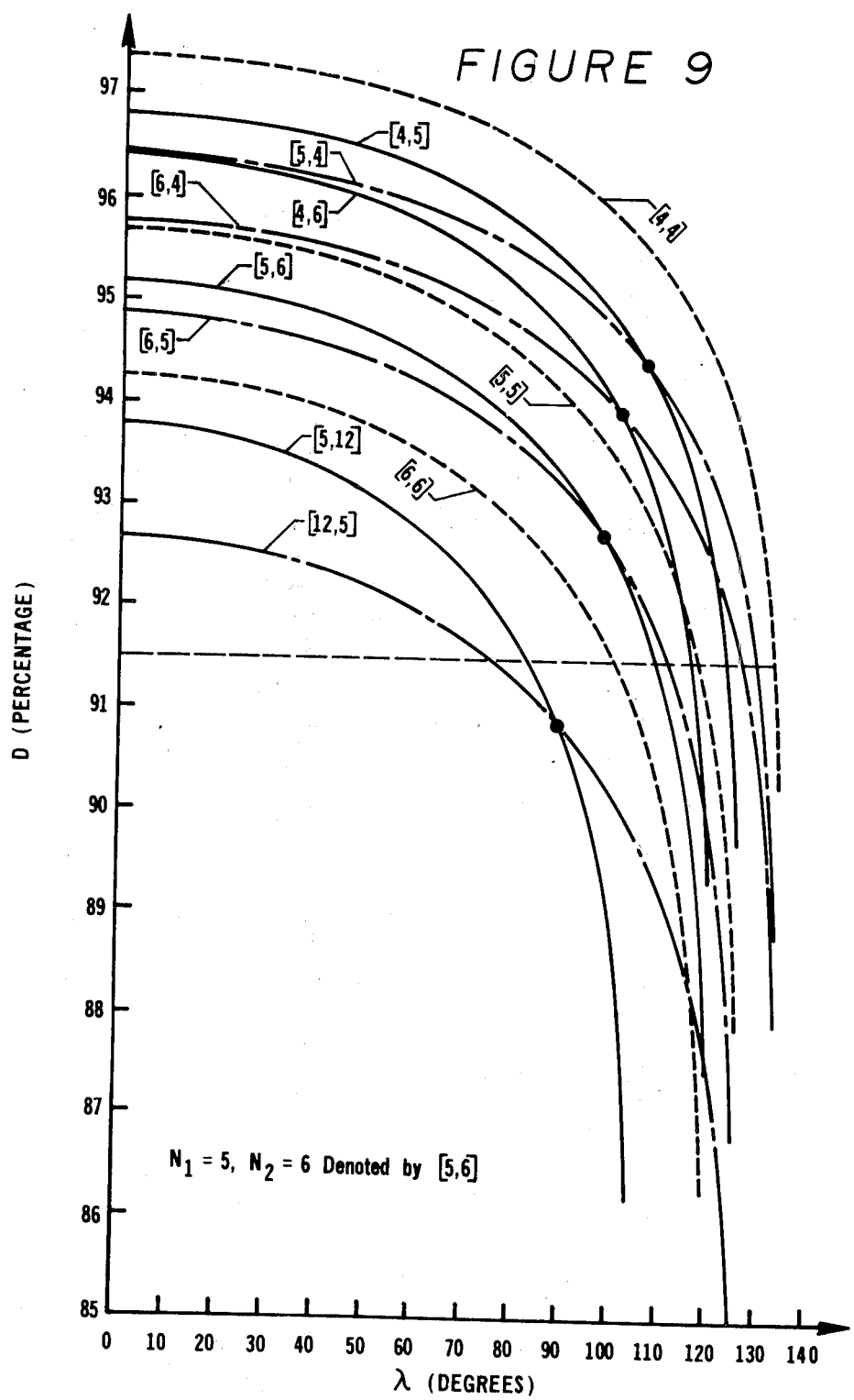
FIG. 9 is a diagram illustrating dwell time versus phase angle.

In FIG. 9, we plot the absolute values of the phase angle $\lambda$ against dwell time D for various combinations of $N_1$ and $N_2$. We may observe from the resulting family of curves that:

(1) Corresponding to a given phase angle, the smaller the number of slots, the longer is the dwell time when the wheels of the two stages have the same number of slots ($N_1 = N_2$).

(2) When the value of $\lambda$ is relatively large, a small variation in $\lambda$ will cause a large variation in dwell time, D. Thus, for an operation where precision in dwell time is the most crucial design requirement, we should select such a combination for $N_1$ and $N_2$ that gives the smallest value of $\lambda$. For example, for a given dwell time D = 91.5 percent, we draw a line parallel to the abscissa (shown in dotted line). The intersections of the line with the family of curves give the values of $N_1$, $N_2$ and the corresponding values of $\lambda$. The one combination of $N_1$ and $N_2$ with the smallest corresponding value of $\lambda$ should be our choice.

(3) For a given installation, that is, with $N_1$ and $N_2$ already fixed, it is still possible to vary the dwell time of the mechanism by fine-tuning its phase angle.

(4) It is possible to obtain the same dwell time by interchanging $N_1$ and $N_2$. The intersections of the two curves corresponding to each pair of $N_1$ and $N_2$ (shown in circular dot) give the dwell time and the corresponding phase angles. For example:

| | |
|---|---|
| $N_1 = 4, N_2 = 5$ | D = 94.3% at $\lambda = 106°$ |
| $N_1 = 5, N_2 = 4$ | |
| $N_1 = 4, N_2 = 6$ | D = 94.0% at $\lambda = 100°$ |
| $N_1 = 6, N_2 = 4$ | |
| $N_1 = 5, N_2 = 6$ | D = 92.8% at $\lambda = 98°$ |
| $N_1 = 6, N_2 = 5$ | |
| $N_1 = 5, N_2 = 12$ | D = 90.89% at $\lambda = 90°$ |
| $N_1 = 12, N_2 = 5$ | |

Figure 10:
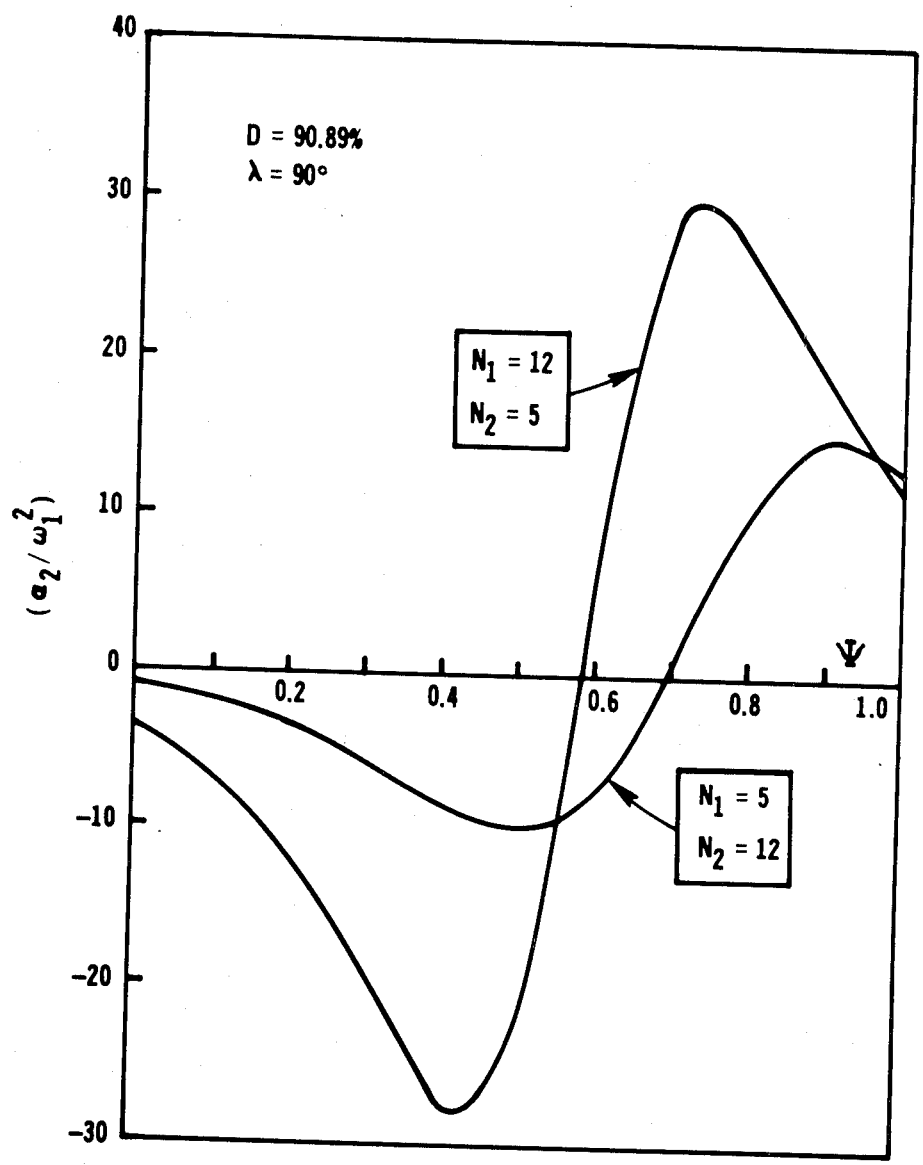
FIG. 10 is a diagram comparing the output acceleration of two Geneva mechanisms employed in the multi-stage Geneva mechanism of this invention and with the same dwell time.

However, it should be noted that the kinematic characteristics of the mechanism with $N_1 = 12$, $N_2 = 5$ are different from those of the mechanisms with $N_1 = 5$, $N_2 = 12$. This is illustrated in FIG. 10. The one with $N_1 = 5$, $N_2 = 12$ has a smoother acceleration curve and lower values of initial and peak angular acceleration that are very much desired.

Figure 11:
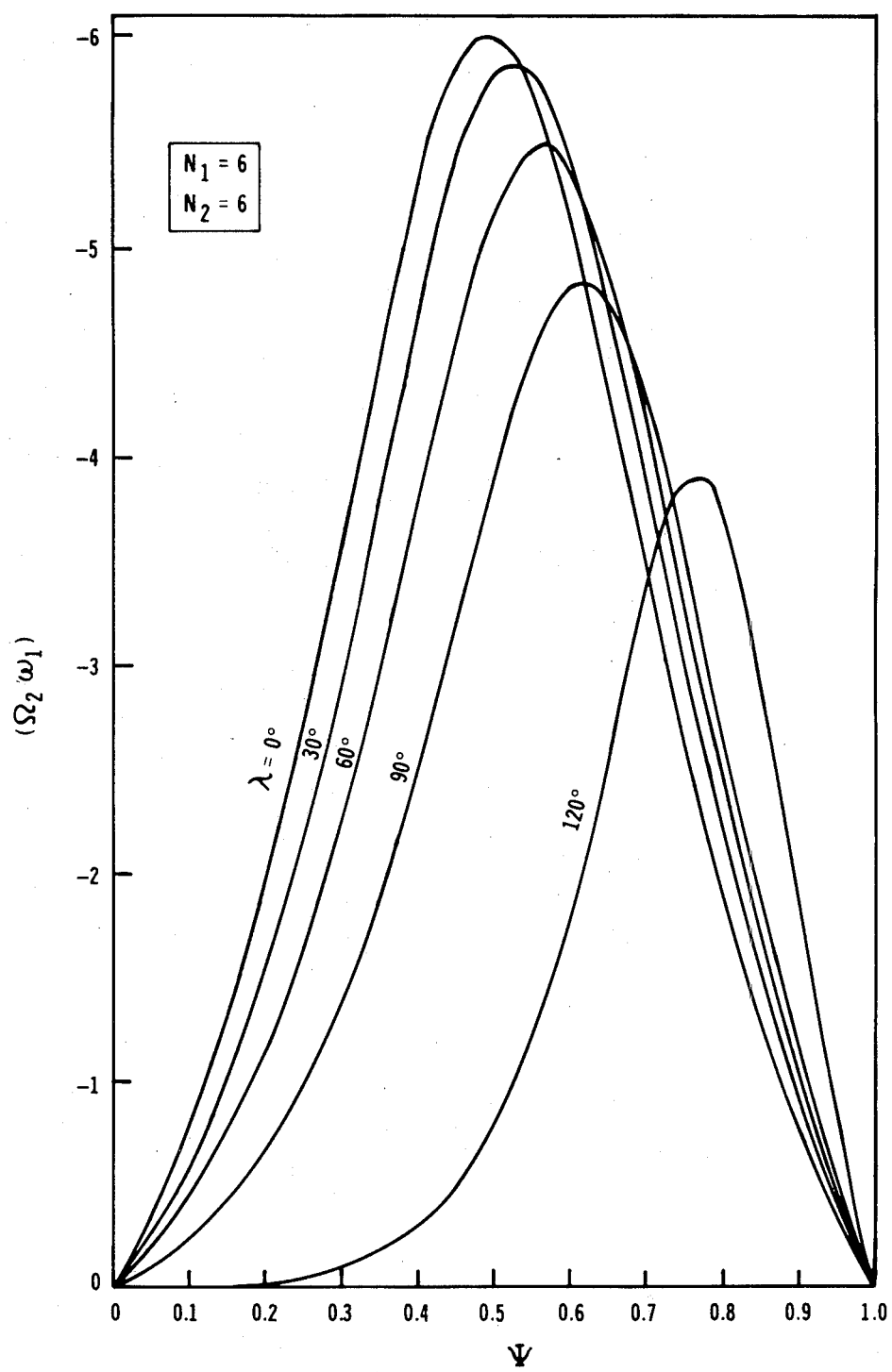
FIG. 11 is a diagram illustrating velocity ratio.
Figure 12:
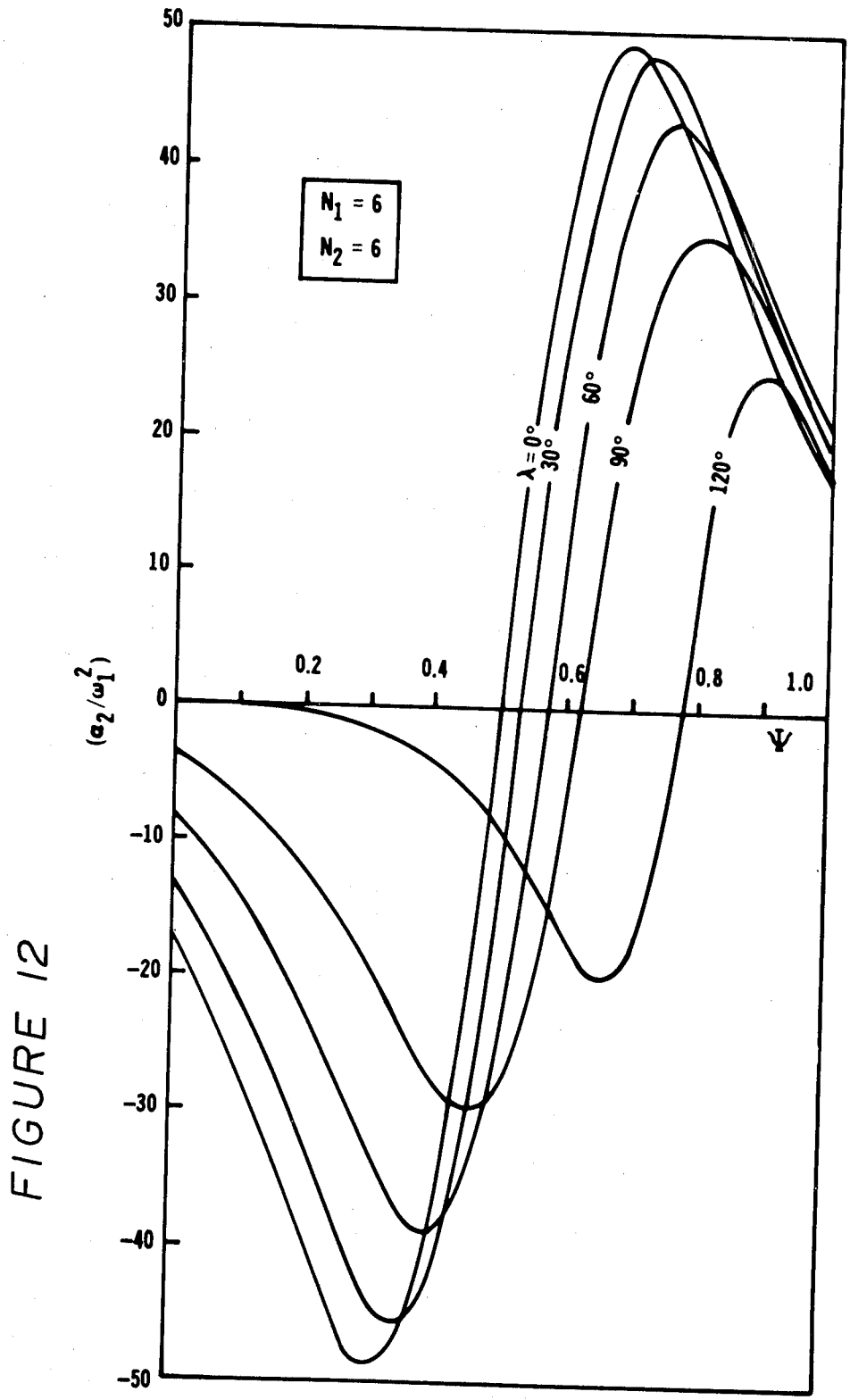
FIG. 12 is a diagram illustrating kinematic characteristics for various phase angle values.

FIGS. 11 and 12 present a comparison of the kinematic characteristics of several mechanisms with the same set of $N_1$ and $N_2$ but with different values of $\lambda$, hence, different dwell time. To facilitate the comparison, we plot velocity ratio $(\Omega_2/\omega_1)$ and output acceleration $(\alpha_2/\omega_1^2)$ against a modified input variable $\Psi$ which is defined as $$\Psi = [\phi_1 - (180 - \delta)]/\eta \qquad (28)$$

Note that this dimensionless variable has values $0 \leq \Psi \leq 1$; when $\Psi = 0$, it corresponds to the beginning of the indexing period, when $\Psi = 1$, the end of the period.

In FIG. 11, it is shown that velocity ratio vanishes at the beginning and the end of the indexing period; the velocity curve for $\lambda = 0$ is symmetrical with respect to the midpoint ($\Psi = 0.5$). A positive value of causes a velocity curve to shift to the right relative to that of $\lambda = 0$.

FIG. 12 illustrates the point that smaller values of $\lambda$ result in larger magnitudes of initial and peak output acceleration. It confirms the observation given in FIG. 9 that, for a given set of $N_1$ and $N_2$, smaller values of $\lambda$ correspond to longer dwell time. It is interesting to note that the acceleration curve for $\lambda = 0$ is also symmetrical with respect to the midpoint.

Figure 13:
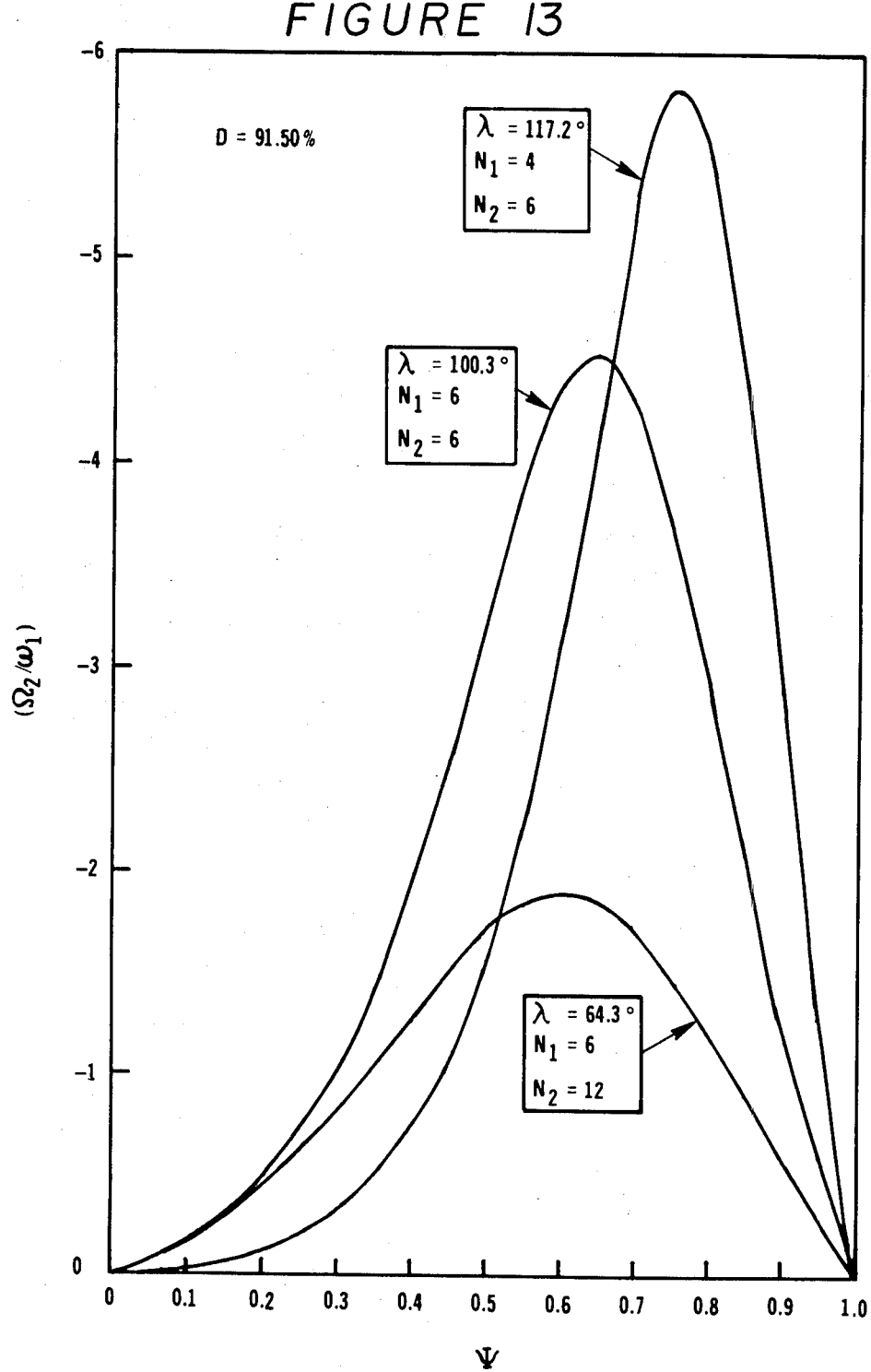
FIG. 13 is a diagram illustrating velocity ratio.
Figure 14:
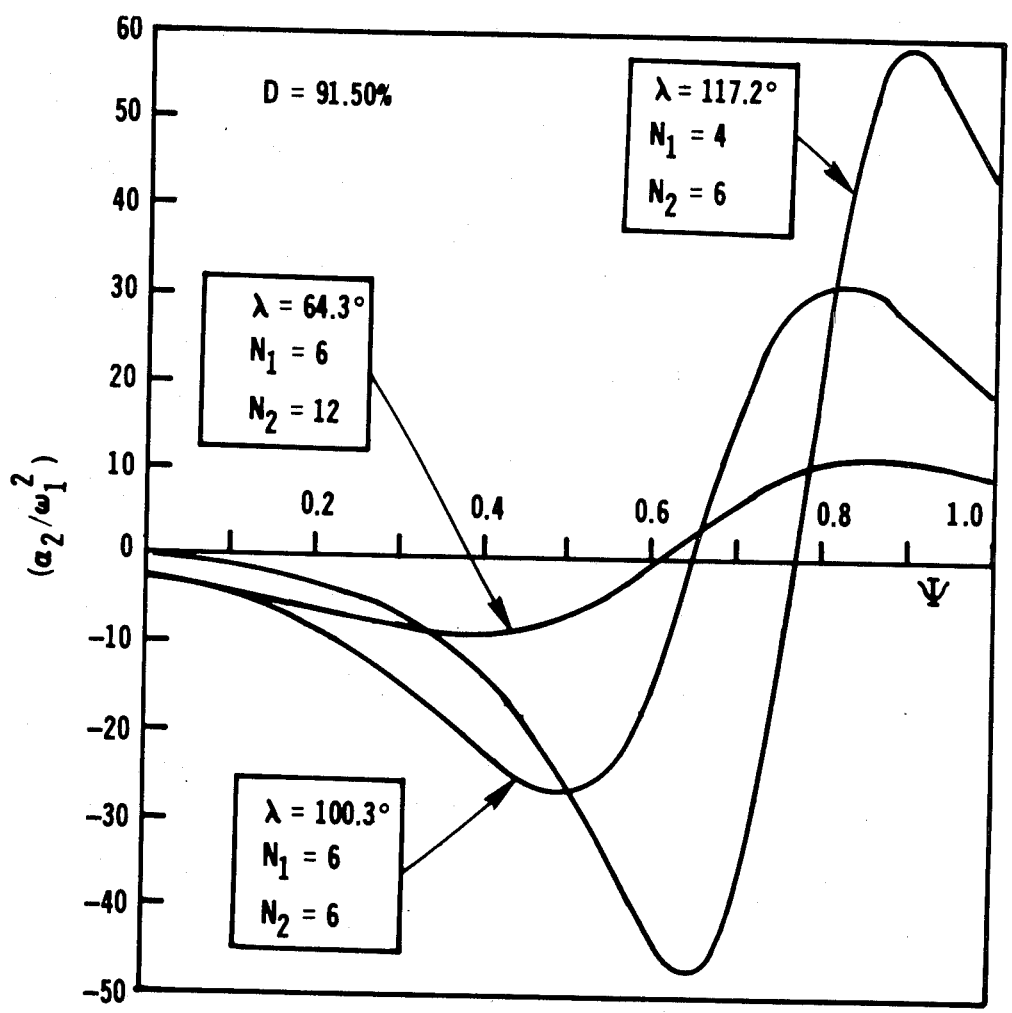
FIG. 14 is a diagram illustrating output acceleration and comparing the kinematic characteristics of three mechanisms with the same dwell time.

FIGS. 13 and 14 present a comparison of the kinematic characteristics of three possible designs for a two-stage geared Geneva mechanism with a prescribed dwell time of 91.5 percent. We may observe that, among the three designs considered, the combination $N_1=6$, $N_2=12$ with $\lambda=64.3°$ has the smoothest velocity curve, relatively low initial output acceleration ($-2.4$), and the lowest peak acceleration ($+12.0$) and the lowest exit acceleration ($+9.6$). With all these favorable kinematic characteristics, this combination certainly is the most desirable of the three considered here.

INDUSTRIAL APPLICABILITY

In an automatic mechanical system, the timing of the output motion per cycle of its intermittent mechanisms must be such that it permits the completion of every designed operation in repetitive, sequential phases. Thus, the most crucial task in the design of an intermittent mechanism is how to produce the dwell time necessary and sufficient to accommodate the completion of a prescribed series of operations. In this application a design concept has been presented for an n-stage geared Geneva mechanism to help the design engineer in meeting this crucial design requirement: a sufficiently long dwell time to accommodate specified operations and, at the same time, an output motion with optimal kinematic characteristics. We have introduced a new parameter, phase angle, into the design of intermittent mechanisms. This new design parameter has the added advantage in that it provides the means to fine-tune dwell time even after an automatic mechanical system has been installed.

For illustrative purposes, we have presented derivation for the dwell time and the kinematic analysis of a two-stage geared Geneva mechanism; results are represented in the form of charts and graphs. Among those presented, FIG. 9, the dwell time-phase angle diagram, is an important design chart. The number of slots on standard off-the-shelf Geneva wheels ranges from three to twelve. It is possible, therefore, to generate a large variety of Geneva-wheel combinations. FIG. 9 shows a few selected combinations of $N_1$ and $N_2$. But, with the aid of computer graphics, it is not difficult to generate a large number of design charts similar to FIG. 9; these charts provide a powerful tool to the design engineer in the selection of a mechanism which meets the prescribed dwell time and which has the most desired kinematic characteristics.

In the examples given above, we have considered only cases where the pin on crank 2 is outside of the slot of wheel 2 during dwell time. This means the absolute value of the phase angle must be equal or less than $(90+\beta_2)$. It is interesting to note that if we let $|\lambda|>(90+\beta_2)$ (this means the pin of crank 2 is inside the slot of wheel 2 during dwell time) we can design a two-stage geared Geneva mechanism with two unequal indexing periods per operating cycle. We may also envision that, by increasing the number of stages and the number of driving pins, a great variety of design combinations may be generated to meet the increasingly rigorous requirements of a modern automatic mechanical system. It should be further understood that other types of constant speed ratio drives could be substituted in lieu of gear train 14 (e.g., chains and sprockets or belt drives), if so desired.

We claim:
1. A multi-stage Geneva mechanism comprising
   a first Geneva mechanism including a first crank having a first drive member engageable with a slotted first wheel to intermittently rotate said first wheel,
   a second Geneva mechanism including a second crank having a second drive member engageable with a slotted second wheel to intermittently rotate said second wheel,
   constant speed ratio drive means, interconnected between said first wheel and said second crank, for rotating said second crank one revolution in response to partial rotation of said first wheel, and
   means for selectively adjusting the phase angle between said second crank and said second wheel, said phase angle being defined as the included angle between a first line intersecting the axes of rotation of said second crank and said second wheel and a second line intersecting the axis of rotation of said second crank and the drive member thereof.

2. The mechanism of claim 1 wherein said constant speed ratio drive means includes a gear train.

3. The mechanism of claim 2 wherein said means for selectively adjusting the phase angle between said second crank and said second wheel is connected to said gear train.

4. The mechanism of claim 3 wherein said drive train includes a differential mechanism including a rotatable shaft connected to said first Geneva mechanism for being driven thereby, a carrier secured on said shaft, at least one planetary gear mounted on said carrier, and a pair of first and second face gears having said planetary gear intermeshed therebetween.

5. The mechanism of claim 4 further including a pair of first and second differential gears rotatably mounted on said shaft and having said first and second face gears secured thereon, respectively, and wherein said second Geneva mechanism is driven sequentially through said shaft, said carrier, said planetary gear, said second face gear, and said second differential gear.

6. The mechanism of claim 1 wherein said means for selectively adjusting the phase angle between said second crank and said second wheel includes a movable indexing adjuster.

7. The mechanism of claim 6 wherein said movable indexing adjuster includes a rotatable indexing disc having indicia thereon, a rotatable shaft secured to said indexing disc, and a gear secured to said last-mentioned shaft and meshing with said first differential gear.

8. The mechanism of claim 1 wherein said first wheel has six slots defined therein and wherein said second wheel has twelve slots defined therein.

9. The mechanism of claim 1 or 8 wherein said phase angle is in the range of 64.3°.

* * * * *

UNITED STATES PATENT AND TRADEMARK OFFICE
CERTIFICATE OF CORRECTION

PATENT NO. : 4,282,778

DATED : August 11, 1981

INVENTOR(S) : An T. Yang and Lih M. Hsia

It is certified that error appears in the above—identified patent and that said Letters Patent is hereby corrected as shown below:

At Column 1, line 12, "evey" should be --every--.
At Column 1, line 56, "cracks" should be --cranks--.
At Column 3, line 59, between "13" and "17," "and" should be --or--.
At Column 4, line 21, after "intermittent", "mechanism" should be -- mechanisms --
At Column 7, line 31, in equation (3), "$(\gamma/N_1)$" should be --$(\lambda/N_1)$--.
At Column 7, line 33, in equation (4), "$(\gamma/N_1)$" should be --$(\lambda/N_1)$--.
At Column 9, line 5, in equation (23), "$[(\dot{p}_1 \rho_1 \Omega_1^2)$" should be --$[(\dot{p}_1 - \rho_1 \Omega_1^2)$--.
At Column 9, line 9, in equation (24), "$e^{i(\phi 2+\gamma)}$" should be --$e^{i(\phi 2+\lambda)}$--.
At Column 10, line 33, "mechanisms" should be --mechanism--.

Signed and Sealed this

Tenth Day of November 1981

[SEAL]

Attest:

GERALD J. MOSSINGHOFF

Attesting Officer

Commissioner of Patents and Trademarks